United States Patent [19]

Senba

[11] Patent Number: 4,885,642
[45] Date of Patent: Dec. 5, 1989

[54] METHOD AND APPARATUS FOR DIGITALLY RECORDING AND REPRODUCING A COLOR VIDEO SIGNAL FOR A SECAM SYSTEM

[75] Inventor: Tetsuo Senba, Kanagawa, Japan

[73] Assignee: Sony Corp., Tokyo, Japan

[21] Appl. No.: 203,168

[22] Filed: Jun. 7, 1988

[30] Foreign Application Priority Data

Jun. 11, 1987 [JP] Japan ................................ 62-145936

[51] Int. Cl.⁴ .......................... H04N 9/79; H04N 9/86
[52] U.S. Cl. ...................................... 358/310; 358/14
[58] Field of Search .................. 358/13, 14, 310, 330; 360/33.1, 39, 40

[56] References Cited

U.S. PATENT DOCUMENTS 3,863,264  1/1975  Nelson et al. ...................... 358/14 X
4,392,159  7/1983  Lemoine et al. ...................... 358/319

Primary Examiner—Robert L. Richardson
Attorney, Agent, or Firm—Alvin Sinderbrand

[57] ABSTRACT

In digitally recording a color video signal for a SECAM system, a horizontal blanking interval including a horizontal synchronizing signal and a non-modulated carrier is not recorded as in the case of a color video signal for a NTSC or PAL system. In a reproducing mode, the non-modulated carrier is restored from the reproduced data and then is inserted in the horizontal blanking interval with the horizontal synchronizing signal, thereby reducing the amount of information to be recorded.

5 Claims, 3 Drawing Sheets

FIG. 2A (DV) 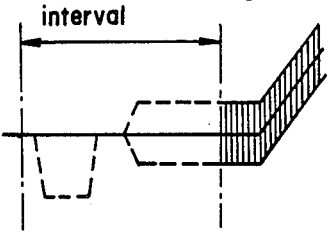
FIG. 2B (CS) 
FIG. 2C (CSI) 
FIG. 2D (CAI) 
FIG. 2E (GC) 
FIG. 2F (CAI*) 
FIG. 2G (CA) 
FIG. 3
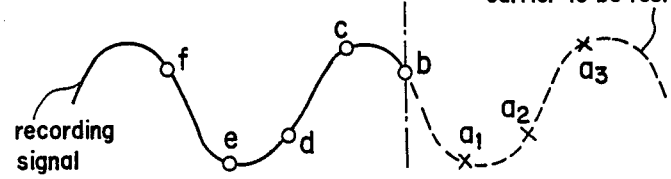

METHOD AND APPARATUS FOR DIGITALLY RECORDING AND REPRODUCING A COLOR VIDEO SIGNAL FOR A SECAM SYSTEM

BACKGROUND OF THE INVENTION

1. Field of the Invention

The present invention relates to a method and apparatus for digitally recording and reproducing a color video signal, particularly for a SECAM television system.

2. Description of the Prior Art

In digitally recording and reproducing a color video signal for a NTSC or PAL television system in the state of a composite signal, a horizontal synchronizing signal and a burst signal both included in a horizontal blanking interval as shown FIG. 4, are not recorded. Only the signal within a scanning interval is digitized and recorded. In the reproducing mode, the horizontal synchronizing signal and the burst signal obtained from the reproducing unit are added to the signal. This technique reduces the amount of information to be recorded. Such technique is based on the fact that, in the color video signal for a NTSC or PAL system, if the horizontal blanking interval is cut out from the color video signal, it can be restored with ease since the cutout point thereof is at the pedestal level which is maintained constant as shown in FIG. 4.

On the other hand, in the color video signal for a SECAM system, the non-modulated carrier corresponds to the burst signal portion in the composite NTSC or PAL signal, as shown in FIG. 5. The non-modulated carrier is continuous with the video portion in the scanning interval as shown and, in addition, its phase is not exactly kept fixed to the sampling axis for digitization.

Therefore, if the horizontal blanking interval, which includes the horizontal synchronizing signal and the non-modulated carrier, is cut out when the SECAM signal is digitally recorded, it is difficult to restore the non-modulated carrier portion in the reproducing mode. Thus, it has been customary heretofore to also record the non-modulated carrier also in digital recording and reproduction of the SECAM signal.

In recording the SECAM signal according to the prior art, since the non-modulated carrier is also recorded, there is no reduction in the amount of information to be recorded. Furthermore, it has been impossible to achieve compatibility with a digital VTR designed for a PAL color signal of the same line sequential video system.

OBJECT AND SUMMARY OF THE INVENTION

It is therefore an object of the present invention to provide an improved method and apparatus for digitally recording and reproducing a color video signal for a SECAM system. In the recording mode, a horizontal blanking interval, including a horizontal synchronizing signal and a non-modulated carrier, is not recorded as in the case of a color video signal for a NTSC or PAL system. In the reproducing mode, the non-modulated carrier is restored from the reproduced data and then is inserted in the horizontal blanking interval with the horizontal synchronizing signal, thereby reducing the amount of information to be recorded.

In recording a SECAM signal by the present invention, each horizontal blanking interval, including the horizontal synchronizing signal and a non-modulated carrier, is omitted, as in the case of NTSC or PAL signal, and only the signal in the scanning interval is recorded after being converted into a digital form.

In the reproducing mode, the data in the scanning interval are time-base inverted and, by the use of a digital filter, the earlier occurring non-modulated carrier is restored on the basis of such inverted data. The carrier thus restored is time-base inverted again and then is inserted into a predetermined portion of the horizontal blanking interval.

In other words, from the data in the scanning interval posterior with respect to time, the non-modulated carrier existing anterior to such scanning interval is restored by the use of a digital filter. Since the non-modulated carrier thus obtained is in a time-base inverted state, the time base is corrected and then the restored carrier is added anterior to the data in the scanning interval, whereby the signal is rendered properly continuous to achieve reproduction of the SECAM signal.

BRIEF DESCRIPTION OF THE DRAWINGS

FIGS. 2A–2G and 3 are waveform diagrams illustrating the operation of the apparatus of FIG. 1;

DETAILED DESCRIPTION OF THE PREFERRED EMBODIMENT

A preferred embodiment of the present invention will be described with reference to the accompanying drawings.

Figure 1:
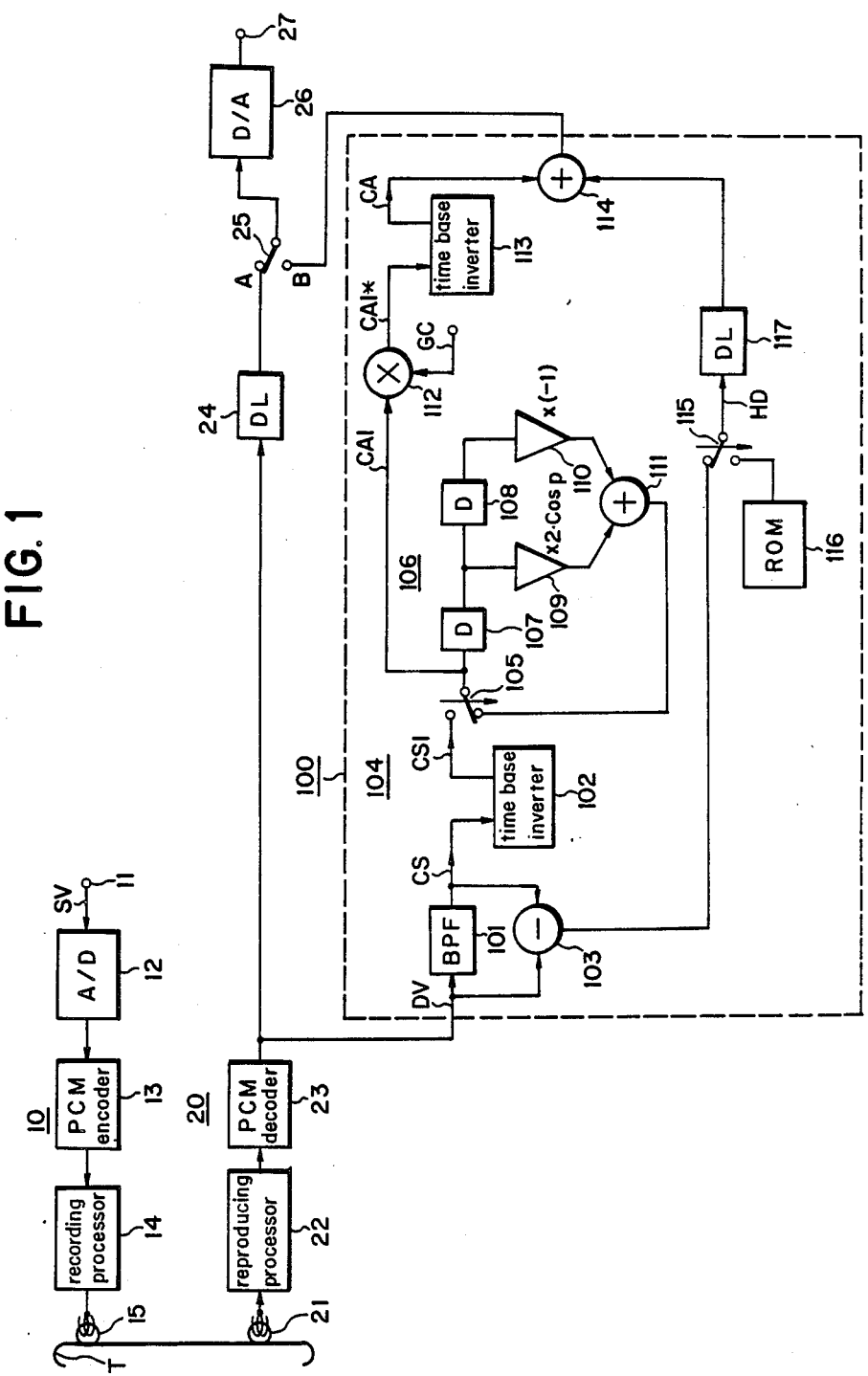
FIG. 1 is a block diagram of exemplary recording and reproducing units for carrying out the method of the present invention.
Figure 4:
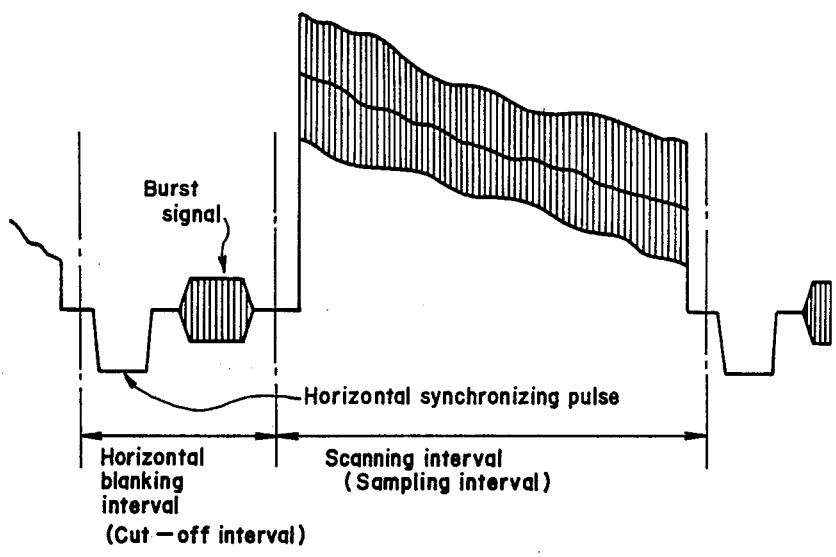
FIG. 4 is a waveform diagram a digital recording interval for a NTSC color video signal.

FIG. 1 shows recording/reproducing apparatus for carrying out the method of the invention, wherein reference numerals 10 and 20 denote a recording unit and a reproducing unit, respectively.

Figure 5:
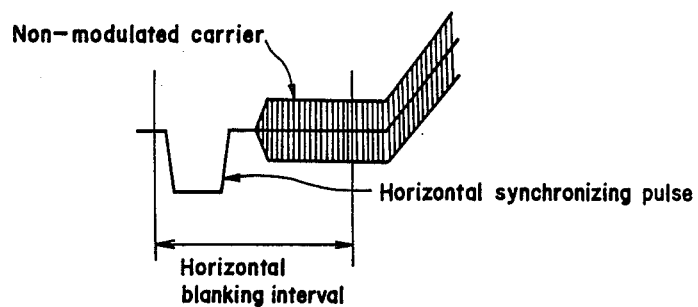
FIG. 5 is a waveform diagram of a digital recording interval for a SECAM color video signal.

Referring first to the recording operation, a SECAM color video signal SV is fed via an input terminal 11 to an A/D converter 12 and is sampled therein by a clock signal of a frequency which is n times (n=integer greater than 2) the subcarrier frequency $f_{sc}$, in such a manner that each sample value is converted into, e.g. an 8-bit digital signal (word). However, in the A/D converter 12, the input SECAM signal SV is not sampled during the horizontal blanking interval, including a horizontal synchronizing pulse and a non-modulated carrier, as shown in FIG. 5. That is, only the signal in the scanning interval is digitized while the blanking interval of the signal SV is cut out.

The digital signal obtained from the A/D converter 12 is fed to a PCM encoder 13, which then performs generation and addition of an error correction code thereto and further interleaves the digital signal against burst error. The digital signal outputted from the PCM encoder 13 is fed to a recording processor 14 so as to be modulated optimally for recording, and the signal thus modulated is recorded on a magnetic tape T by means of a recording head 15.

A description will now be given of the reproducing unit 20 which comprises a reproducing head 21. This head 21 may be combined with the recording head 15.

The reproduced signal obtained from the head 21 is fed to a reproducing processor 22, where the digital signal is reproduced and demodulated. The digital signal thus demodulated is then fed to a PCM decoder 23, which performs deinterleave, error correction and so forth.

Although no data are existent as a recording signal in the horizontal blanking interval, a digital video signal with predetermined data (of the pedestal level) inserted in the horizontal blanking interval is obtained as the output signal of the PCM decoder 23.

The output signal of the PCM decoder 23 is fed to one input terminal A of a switching circuit 25 via a timing delay circuit 24 while being fed also to a horizontal blanking signal generator 100. This circuit 100 produces a horizontal blanking interval signal including a horizontal synchronizing signal and a restored non-modulated carrier as will be described hereinafter. The interval signal is fed to another input terminal B of the switching circuit 25, which is so actuated as to select the input terminal A during the scanning interval or to select the input terminal B during the horizontal blanking interval. Therefore, the SECAM digital signal with the inserted data of the cutout horizontal blanking interval is obtained from the switching circuit 25 and then is fed to D/A converter 26 where the digital signal is converted into an analog form, so that the reproduced SECAM color video signal is obtained from the output terminal 27.

The horizontal blanking signal generator 100 in this embodiment is constituted of the following circuit configuration.

The digital signal DV (FIG. 2A) from the PCM decoder 23 is fed to a digital band-pass filter 101 which provides a color subcarrier component CS (FIG. 2B) composed of FM digital color difference signals R-Y and B-Y.

In restoring the non-modulated carrier from the reproduced signal, the requisite is to achieve restoration of the earlier non-modulated carrier from the signal CS recorded and reproduced. In the present invention, the non-modulated carrier is estimated and restored from the signal CS reproduced with time-base inversion.

For this purpose, the color subcarrier component CS is fed to a time base inverter 102, which then produces a time-base inverted signal CSI (FIG. 2C). Due to such time base inversion, the non-modulated carrier to be restored occurs after the scanning interval which would otherwise follows the non-modulated carrier. The time base inverter 102 can be realized by the use of a FILO (first-in last-out) memory or a buffer memory and an address control circuit.

The output signal of the time base inverter 102 is fed to a non-modulated carrier restore circuit 104.

The restore circuit 104 employed in this embodiment consists of a switching circuit 105 and an IIR (infinite impulse response) type digital filter 106. In this example, sample data of the non-modulated carrier are sequentially estimated and restored from two samples (two words) of the signal CSI. The digital filter 106 comprises the 1-word delay registers 107 and 108, two coefficient multipliers 109 and 110, and an adder 111. The FILO memory or buffer memory serving as the time base inverter 102 meets the requirement if it has a capacity of two words. When two sample data immediately before the non-modulated carrier (immediately after in the original time base) to be restored in the signal CSI have been loaded in the delay registers 107 and 108, the switching circuit 105 is placed in the state illustrated and functions as an IIR filter.

FIG. 3 shows an analog waveform (after time base inversion) of the reproduced color subcarrier data and the non-modulated carrier data estimated and restored therefrom. The operation of the digital filter 106 will be described below with reference to this waveform.

In this example, first sample datum $a_1$ of the non-modulated carrier to be restored is estimated from the reproduced sample data b and c immediately prior thereto. In relation to the carrier sin x and the sampling period p, the sample datum can be expressed respectively as $$a_1 = \sin(x+q+p) \quad (1)$$

$$b = \sin(x+q) \quad (2)$$

$$c = \sin(x+q-p) \quad (3)$$

where q represents a phase term. The sampling period p is a constant determined by the carrier frequency and the sampling frequency, and it is different in each horizontal interval.

Eliminating $\sin(x+q)$ from the above equations, $$a_1 = 2b \cdot \cos p - c \quad (4)$$

so that the sample datum $a_1$ can be calculated. Once the datum is obtained, the datum $a_2$ next to such datum $a_1$ can be calculated from $a_1$ and b. Thereafter, the successive data can be obtained sequentially in a similar manner. For satisfying Eq. (4), a coefficient ($2 \cdot \cos p$) is fed to the coefficient multiplier 109 in the digital filter 106, and a coefficient ($-1$) is fed to the coefficient multiplier 110.

After the lapse of the time required for restoring the non-modulated carrier, the switching circuit 105 is actuated to resume the state opposite to that illustrated.

Thus, the restored non-modulated carrier CAI (FIG. 2D) is obtained from the junction of the switching circuit 105 or the output terminal of the digital filter 106 and the delay register 107, and such carrier CAI is fed to a gain control circuit 112. A gain control signal GC (FIG. 2E) is fed to the gain control circuit 112, whereby the non-modulated carrier is so corrected as to smoothly rise in view of the proper time base (FIG. 2F).

The non-modulated carrier CAI* after such gain control is fed to a time base inverter 113 which comprises a FIFO type memory or buffer memory similarly to the aforementioned circuit 102, so that the time base is inverted again to resume the former state, whereby the non-modulated carrier CA (FIG. 2G) with the proper time base is obtained.

The non-modulated carrier CA is then fed to an adder 114.

Meanwhile the color subcarrier component from the digital band-pass filter 101 is fed to a subtractor 103 so as to be subtracted from the digital video signal outputted from the PCM decoder 23, whereby the luminance component data alone is obtained from the subtractor 103. These data are then fed to one input terminal of a switching circuit 115.

The horizontal synchronizing pulse data are stored in a ROM 116, and the horizontal synchronizing pulse data read out therefrom are fed to the switching circuit 115, which is selectively connected to the ROM 116 only during the horizontal synchronizing pulse interval.

Accordingly the switching circuit 115 provides data HD with a horizontal synchronizing pulse added to the pedestal level, and such data HD are fed to the adder 114 via a timing delay circuit 117. Then the adder 114 outputs data of the horizontal blanking interval including the horizontal synchronizing signal and the non-modulated carrier, and the data thus outputted are fed to the switching circuit 25 so as to be inserted into the digital video signal data obtained from the PCM decoder 23 as mentioned previously.

In this stage, the non-modulated carrier is the one restored on the basis of the signal adjacent thereto, so that satisfactory continuity at the joint can be achieved with certainty.

It is to be understood that the above is merely an example where one sample datum of the non-modulated carrier is calculated from two sample data. The number of delay registers and taps in the digital filter 106 may be increased so that the non-modulated carrier can be estimated from three, four or more samples, whereby a higher precision is rendered attainable in restoring the non-modulated carrier.

The gain control circuit 112 may be omitted by changing the coefficients fed to the coefficient multipliers 109 and 110 in the digital filter 106.

In the present invention, a non-modulated carrier can be restored from a reproduced signal by the use of time base inverters and a digital filter, so that even in digital recording and reproduction of a SECAM color video signal, each horizontal blanking interval including a horizontal synchronizing signal and a non-modulated carrier can be cut out and only the signal in the scanning interval alone digitally recorded and reproduced. Consequently, it is possible to reduce the amount of information to be recorded, and further to attain compatibility with a digital recording/reproducing apparatus designed for a PAL color video signal.

What is claimed is:

1. A method of digitally recording and reproducing a color video signal for a SECAM system, said signal comprising a scanning interval and an earlier occurring horizontal blanking interval, said horizontal blanking interval including a horizontal synchronizing signal and a non-modulated carrier, said method comprising:

digitizing and recording the video signal during the scanning interval but not during the horizontal blanking interval; and reproducing the digital signal, inverting the time base of the data from said scanning interval, restoring, by means of a ditigal filter, the earlier occurring non-modulated carrier as a function of the time-base inverted data, inverting the time-base of said non-modulated carrier thus restored, and inserting the non-modulated carrier in a predetermined portion of said horizontal blanking interval.

2. An apparatus for digitally recording and reproducing a color video signal for a SECAM system, said signal comprising a scanning interval and a horizontal blanking interval with a non-modulated carrier included partially within said horizontal blanking interval, said apparatus comprising:

recording means for digitizing and recording the signal during the scanning interval but not during the horizontal blanking interval;

reproducing means for reproducing the signal recorded by said recording means;

sampling means for sampling the non-modulated carrier component from the reproduced signal;

time-base inverting means for inverting the time base of the sampled non-modulated carrier components;

non-modulated carrier restoring means for restoring, from the non-modulated carrier component outputted from said time-base inverting means, the non-modulated carrier in the horizontal blanking interval; and adding means for reproducing the complete non-modulated carrier by adding the portion of the non-modulated carrier which is included in the horizontal blanking interval and obtained from said restoring means to the portion of the non-modulated carrier included in the scanning interval and obtained from said reproducing means.

3. The apparatus according to claim 2, wherein said non-modulated carrier restoring means comprises a cyclic IIR (infinite impulse response) type digital filter.

4. The apparatus according to claim 2, wherein said sampling means comprises a digital band pass filter.

5. The apparatus according to claim 2, wherein said time-base inverting means comprises a digital memory and inverts the time base by reading out the written non-modulated carrier in the reverse direction.

* * * * *